(12) United States Patent
Yuzawa et al.

(10) Patent No.: US 10,317,206 B2
(45) Date of Patent: Jun. 11, 2019

(54) LOCATION DETERMINATION PROCESSING DEVICE AND STORAGE MEDIUM

(71) Applicant: FUJI XEROX CO., LTD., Tokyo (JP)

(72) Inventors: Hideto Yuzawa, Yokohama (JP); Takayuki Takeuchi, Yokohama (JP); Masahiro Sato, Yokohama (JP); Akira Ichiboshi, Yokohama (JP); Jiro Matsuda, Yokohama (JP); Shinobu Ozeki, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 544 days.

(21) Appl. No.: 14/807,442

(22) Filed: Jul. 23, 2015

(65) Prior Publication Data

US 2015/0330780 A1 Nov. 19, 2015

Related U.S. Application Data

(63) Continuation of application No. PCT/JP2013/080051, filed on Nov. 6, 2013.

(30) Foreign Application Priority Data

May 21, 2013 (JP) ................. 2013-106759

(51) Int. Cl.
*G01C 5/06* (2006.01)
*G01K 13/00* (2006.01)
*G01C 21/20* (2006.01)

(52) U.S. Cl.
CPC ............ *G01C 5/06* (2013.01); *G01C 21/206* (2013.01); *G01K 13/00* (2013.01)

(58) Field of Classification Search
CPC ....................................................... G01C 5/06
See application file for complete search history.

(56) References Cited

U.S. PATENT DOCUMENTS

| 5,224,059 A | 6/1993 | Nitta et al. |
| 7,933,836 B2 | 4/2011 | Erhart et al. |
| 8,612,221 B2 | 12/2013 | Yoshizawa et al. |

(Continued)

FOREIGN PATENT DOCUMENTS

| JP | H01-307614 A | 12/1989 |
| JP | H08-285582 A | 11/1996 |

(Continued)

OTHER PUBLICATIONS

Jan. 19, 2017 Office Action issued in Chinese Patent Application No. 201380074772.3.

(Continued)

*Primary Examiner* — Yu-Hsi D Sun
(74) *Attorney, Agent, or Firm* — Oliff PLC

(57) ABSTRACT

A location determination processing device includes: an accepting section as defined herein; an atmospheric pressure information accepting section as defined herein; a computation result accepting section as defined herein; an identification result accepting section as defined herein; a detection result accepting section as defined herein; a determination result accepting section as defined herein; a correcting section as defined herein; and an outputting section as defined herein.

12 Claims, 11 Drawing Sheets

(56) References Cited

U.S. PATENT DOCUMENTS

2009/0286556 A1* 11/2009 Yumoto ................ G01C 21/20
   455/456.6
2010/0082484 A1    4/2010  Erhart et al.
2010/0198591 A1    8/2010  Yoshizawa et al.

FOREIGN PATENT DOCUMENTS

| JP | 2009-281741 A | 12/2009 |
| JP | 2010-088095 A | 4/2010 |
| JP | 2010-183289 A | 8/2010 |
| JP | 2013-200156 A | 10/2013 |
| WO | 2012/052766 A2 | 4/2012 |

OTHER PUBLICATIONS

Dec. 17, 2013 International Search Report issued in International Patent Application No. PCT/JP2013/080051.
Dec. 17, 2013 Written Opinion issued in International Patent Application No. PCT/JP2013/080051.

* cited by examiner

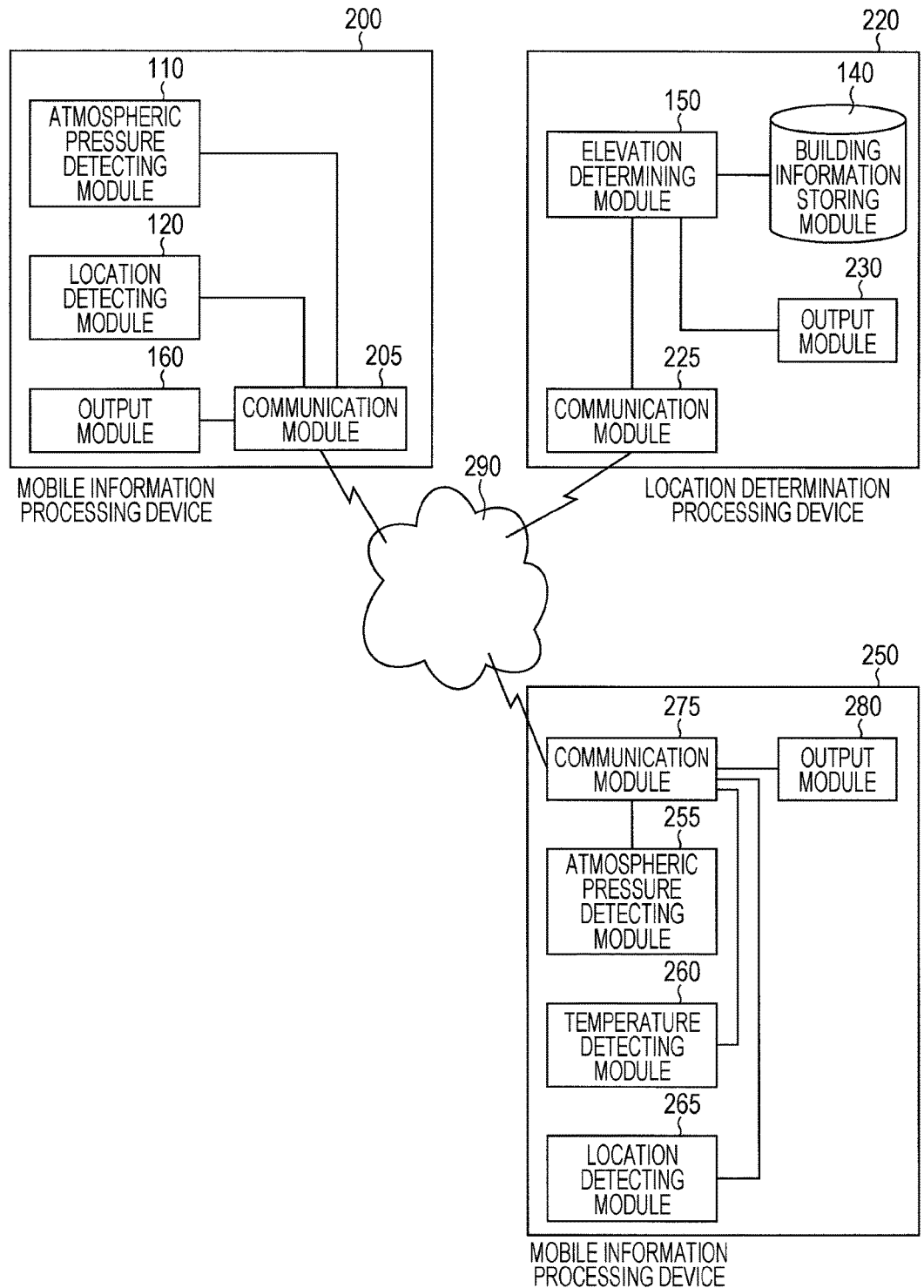

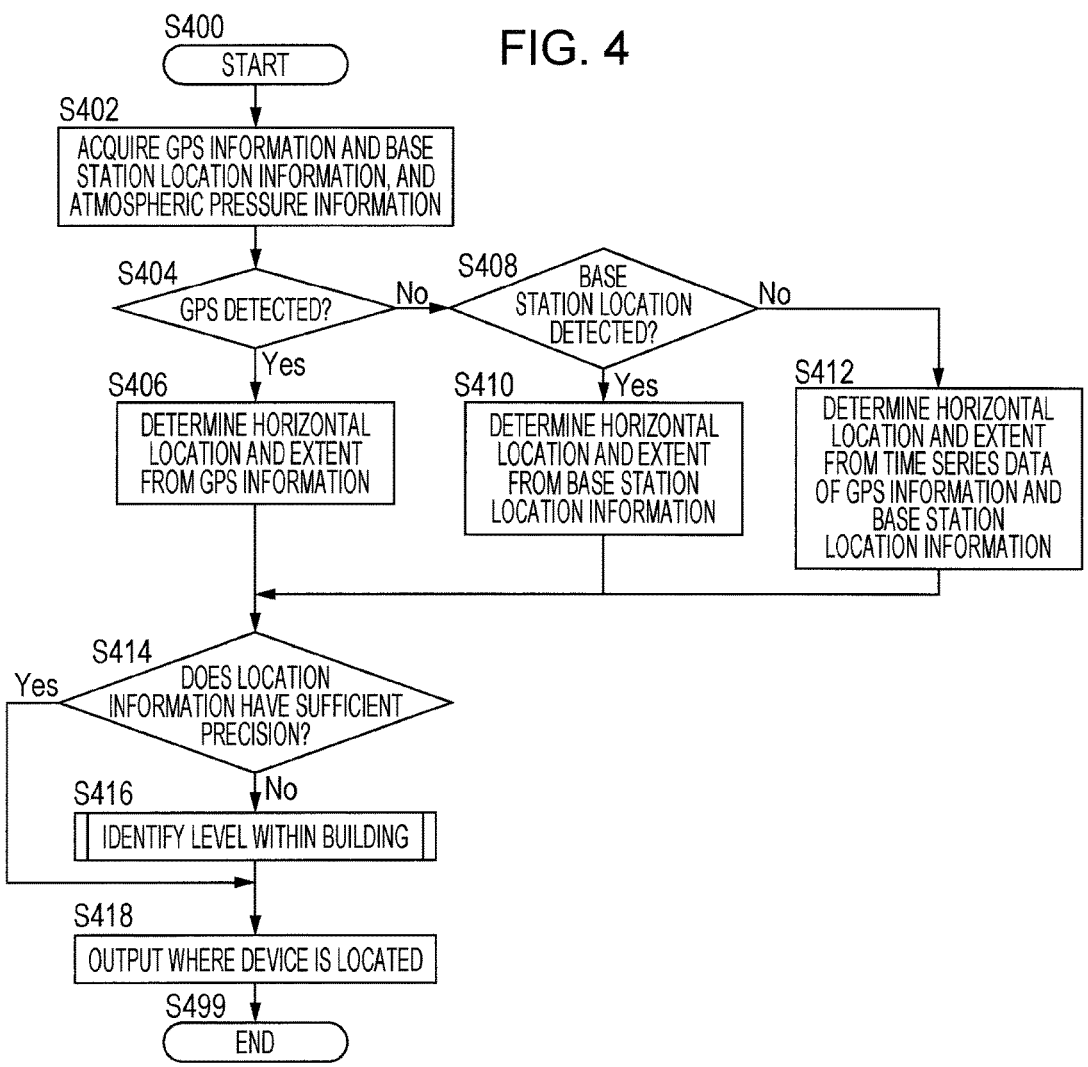

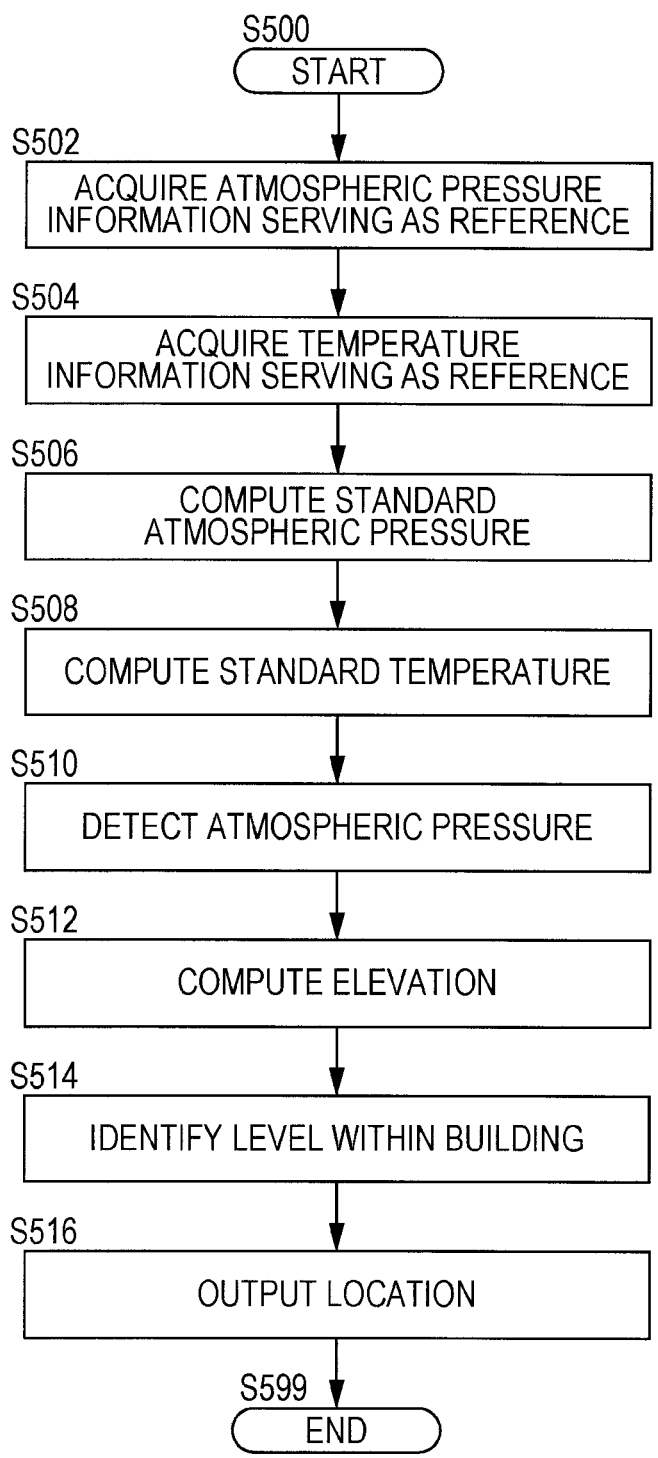

FIG. 6

| TIME | REFERENCE | | | | USER | | CALCULATION RESULTS | |
|---|---|---|---|---|---|---|---|---|
| | DATA MEASURED ON 15F | | CALCULATIONS FROM 15F DATA | | MEASURED ATMOSPHERIC PRESSURE p | MEASUREMENT FLOOR | ELEVATION [m] | ESTIMATED FLOOR |
| | MEASURED ATMOSPHERIC PRESSURE p | ELEVATION [m] | MEASURED TEMPERATURE t | $p_0$ | $t_0$ | | | | |
| 16:45:24 | 1002.115 | 77 | 33.5 | 1010.743 | 34.0005 | 1008.864 | 3F | 16.72 | 3F |
| 16:47:37 | 1002.162 | 77 | 33.31569 | 1010.796 | 33.81619 | 1004.691 | 10F | 54.39 | 10F |

LOCATION DETERMINATION PROCESSING DEVICE AND STORAGE MEDIUM

CROSS REFERENCE TO RELATED APPLICATION

This is a continuation of International Application No. PCT/JP2013/080051 filed on Nov. 6, 2013, and claims priority from Japanese Patent Application No. 2013-106759, filed on May 21, 2013.

TECHNICAL FIELD

The present invention relates to a location determination processing device, a location determination processing method, a mobile information processing device, a mobile information processing method, and a storage medium.

SUMMARY OF INVENTION

According to an aspect of the invention, there is provided a location determination processing device including an accepting section that accepts reference information, the reference information including information related to atmospheric pressure and information related to temperature which are detected by a detection device and information related to altitude detected by the detection device, an atmospheric pressure information accepting section that accepts information related to atmospheric pressure for a location where an information processing device that is mobile exists, a computation result accepting section that accepts a computation result of computing an altitude on a basis of the reference information accepted by the accepting section and the information related to atmospheric pressure accepted by the atmospheric pressure information accepting section, an identification result accepting section that accepts an identification result of identifying, from a storing section that stores a correspondence between a level and an elevation of the level, a level corresponding to the altitude accepted by the computation result accepting section, a detection result accepting section that accepts a detection result of detecting, on a basis of a status of an owner of the mobile information processing device, a level on which the owner is located, a determination result accepting section that accepts a determination result of determining whether a difference exists between the level obtained as the detection result accepted by the detection result accepting section and the level obtained as the identification result accepted by the identification result accepting section, a correcting section that, if the determination result accepted by the determination result accepting section indicates that a difference exists, corrects the level accepted by the identification result accepting section, by using the level accepted by the detection result accepting section, and an outputting section that, if the determination result accepted by the determination result accepting section indicates that a difference exists, outputs the level corrected by the correcting section.

BRIEF DESCRIPTION OF DRAWINGS

FIG. 2 illustrates an exemplary system configuration for implementing the embodiment.
FIG. 3 illustrates an exemplary data structure of a building information table.
FIG. 4 is a flowchart illustrating exemplary processing according to the embodiment.
FIG. 5 is a flowchart illustrating exemplary processing according to the embodiment.
FIG. 6 illustrates an exemplary data structure of a measurement/identification results table.

Figure 1:
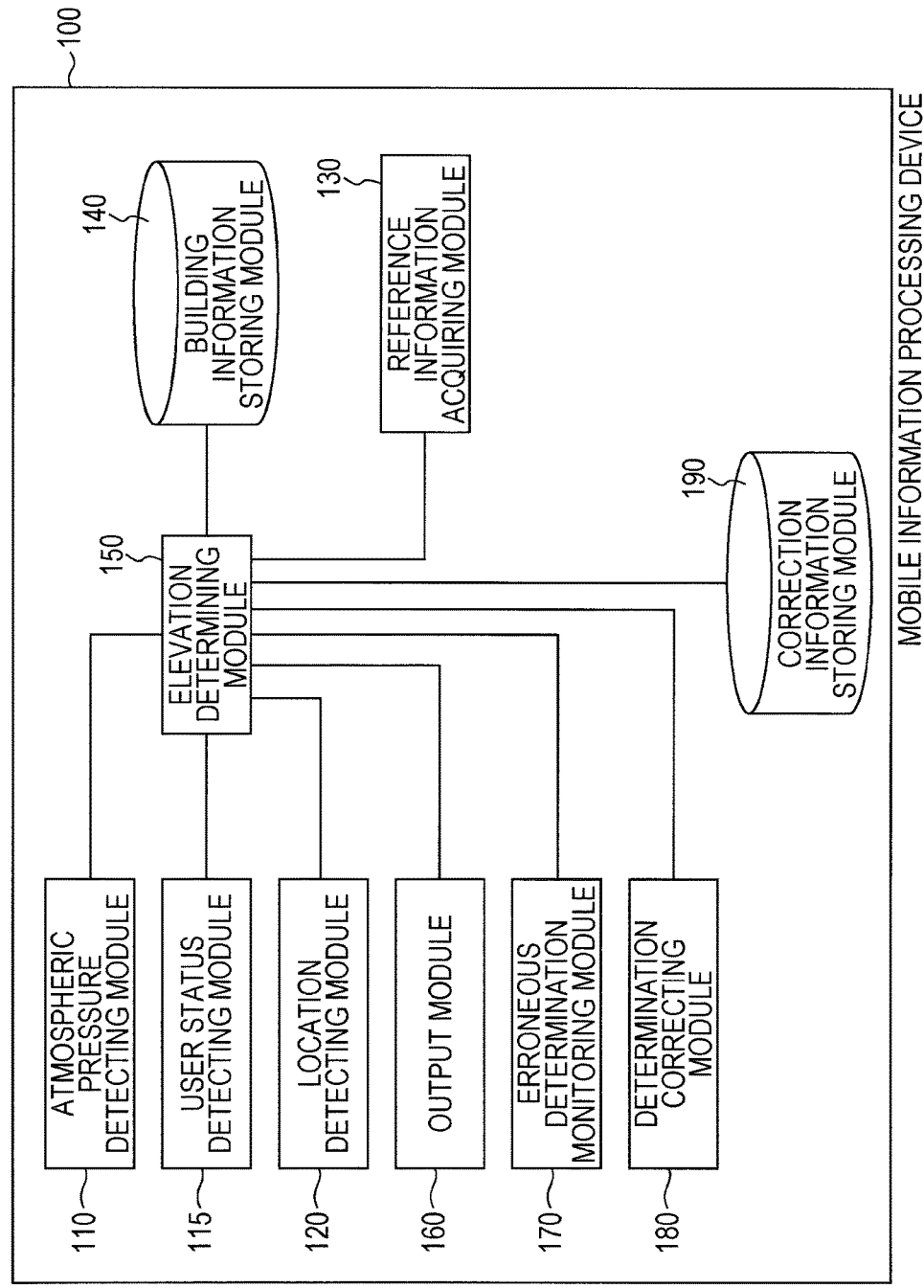
FIG. 1 is a conceptual module diagram about an exemplary configuration of the embodiment.

REFERENCE SIGNS LIST 100 information processing device
110 atmospheric pressure detecting module
115 user status detecting module
120 location detecting module
130 reference information acquiring module
140 the building information storing module
150 elevation determining module
160 output module
170 erroneous determination monitoring module
180 determination correcting module
190 correction information storing module
200 mobile information processing device
205 communication module
220 location determination processing device
225 communication module
230 output module
250 mobile information processing device
255 atmospheric pressure detecting module
260 temperature detecting module
265 location detecting module
275 communication module
280 output module
290 communication line

DETAILED DESCRIPTION

Hereinafter, an example of a preferred embodiment for implementing the present invention will be described with reference to the drawings.

FIG. 1 is a conceptual module diagram about an exemplary configuration according to the embodiment.

The term "module" generally refers to a logically separable component of software (computer program), hardware, or the like. Therefore, the term "module" as used in the embodiment refers to not only a module in a computer program but also a module in a hardware configuration. Thus, the embodiment will be also described in the context of a computer program for providing functions of modules (a program for causing a computer to execute individual procedures, a program for causing a computer to function as individual means, and a program for causing a computer to realize individual functions), a system, and a method. While "store", "be stored", and equivalent expressions are used herein for the convenience of description, these expressions mean, when the embodiment relates to a computer program, "cause a storage device to store" or "perform control so as to cause a storage device to store". While individual modules and functions may have a one-to-one correspondence, in actual implementation, a single module may be implemented by a single program, or multiple modules may be implemented by a single program. Conversely, a single module may be implemented by multiple programs. Further, multiple modules may be executed by a single computer, or a single module may be executed by multiple computers that are in a distributed or parallel environment. A single module may include another module. In the following description, the term "connection" refers to not only a physical connection but also a logical connection (such as exchanging of data, issuing of an instruction, and cross-reference between data items). The term "predetermined" as used herein means being determined prior to a process of interest, which not only means being determined before processing according to the embodiment begins but also being determined, even after the processing according to the embodiment begins, at any point in time preceding a process of interest in accordance with the condition/state at that point in time, or in accordance with the condition/state up to that point in time. If multiple "predetermined values" exist, each of these values may be different, or two or more of these values may be the same (which includes, of course, cases where all of these values are the same). Further, expressions that have the meaning of "if A, then B" is used to mean that "it is determined whether A, and then B if it is determined that A", unless it is not required to determine whether A.

Furthermore, the term "system" or "device" includes not only cases where a system or device is made up of multiple computers, hardware components, devices, or the like that are connected to each other via a communication medium such as a network (including a one-to-one communication setup), but also cases where a system or device is implemented by a single computer, hardware component, or device. The terms "device" and "system" are herein used synonymously. As a matter of course, the term "system" does not include what is merely a social "mechanism" (social system) which is a man-made arrangement of rules.

Further, for each process executed by each module or, if multiple processes are to be executed within a module, for each of the multiple processes, information of interest is read from a storage device, and after execution of the corresponding process, the results of processing are written into the storage device. Therefore, a description about reading of information from a storage device prior to a process, or writing of information into a storage device after a process will sometimes be omitted. The term "storage device" as used herein may include a hard disk, a random access memory (RAM), an external storage medium, a storage device using a communication line, and a register in a central processing unit (CPU).

A mobile information processing device 100 according to the embodiment outputs the location where a mobile information processing device exists. As illustrated in the example of FIG. 1, the mobile information processing device 100 has an atmospheric pressure detecting module 110, a user status detecting module 115, a location detecting module 120, a reference information acquiring module 130, a building information storing module 140, an elevation determining module 150, an output module 160, an erroneous determination monitoring module 170, a determination correcting module 180, and a correction information storing module 190. The information processing device 100, which is mobile, has communication capability. The information processing device 100 is, for example, a mobile phone (including a smart phone), or a notebook PC (tablet PC) that has communication capability. The information processing device 100, which may include at least the atmospheric pressure detecting module 110, also generally includes the location detecting module 120. As will be described later with reference to the example of FIG. 2, one or more of the reference information acquiring module 130, the building information storing module 140, the elevation determining module 150, and the output module 160 may be constructed in another information processing device. Detecting the location of the information processing device 100 means detecting the location of a person who is carrying the information processing device 100.

Information related to atmospheric pressure will be simply referred to as atmospheric pressure, and information related to altitude will be simply referred to as altitude. Information related to atmospheric pressure includes at least information indicative of the atmospheric pressure itself, and may include, as other pieces of information associated with the atmospheric pressure, for example, the date and time when the atmospheric pressure is detected (year, month, day, hour, minute, second, or a fraction of a second, or a combination thereof; the same applies hereinafter), and identification information for identifying the measurement unit used to detect the atmospheric pressure. Information related to temperature includes at least information indicative of the temperature itself, and may include, as other pieces of information associated with the temperature, for example, the date and time when the temperature is detected, and identification information for identifying the measurement unit used to detect the temperature. Information related to altitude includes at least information indicative of the altitude itself, and may include, as other pieces of information associated with the altitude, for example, the date and time when the altitude is detected, and identification information for identifying the measurement unit used to detect the altitude.

The atmospheric pressure detecting module 110 is connected to the elevation determining module 150. The atmospheric pressure detecting module 110 detects the atmospheric pressure at the location where the mobile information processing device 100 exists. The atmospheric pressure detecting module 110 is a so-called atmospheric pressure sensor.

The atmospheric pressure detecting module 110 periodically detects atmospheric pressure.

The location detecting module 120 is connected to the elevation determining module 150. The location detecting module 120 detects the location where the information processing device 100 exists. The location detecting module 120 corresponds to, for example, a GPS, or a location detecting module for base stations (for example, 3G base stations or WiFi base stations) in wireless communication networks. In this regard, processing by the elevation determining module 150 may be performed when the location detecting module 120 detects a first time point. Examples of the first time point include a time point when it becomes no longer possible to detect a location by means of GPS or base-station location detection, and a time point when the precision of GPS or base-station location detection becomes less than, or less than or equal to, a predetermined value. Specifically, this time point corresponds to a time point when a person who is carrying (to be also simply referred to as "carrier" hereinafter) the information processing device 100 enters a building such as a multi-level ferroconcrete building, which corresponds to a state referred to as so-called GPS dead spot. That is, the carrier of the information processing device 100 is on a level (to be also referred to as "floor" hereinafter) of the building where the entrance (entrance/exit, including the front door or the like) of the building is located. Accordingly, the first time point specifically means the time of entry on a level within a building where the entrance is located.

The GPS or the base-station location detecting module outputs, in addition to a location (latitude and longitude), information indicating the precision of the detected location. Specifically, in the case of the GPS, this information includes the horizontal dilution of precision and the like. With each of these values taken as the precision of GPS or base-station location detection, whether the value has become less than, or less than or equal to, a predetermined value may be determined.

The location detecting module 120 periodically detects location.

The location detecting module 120 may detect the altitude (elevation above sea level) of the information processing device 100. For example, the GPS also detects altitude in addition to latitude and longitude.

The reference information acquiring module 130 is connected to the elevation determining module 150. The reference information acquiring module 130 accepts an atmospheric pressure and temperature detected by a detection device, and the altitude at which the detection device is located. The detection device may be built in the reference information acquiring module 130, or may be another detection device. Of course, the detection device used may be either one or both of "built-in detection device" and "another detection device". If both of these detection devices are used, for example, the means of atmospheric pressures, temperatures, and altitudes from the two detection devices may be used. For example, "another detection device" corresponds to a mobile information processing device 250 described later. That is, "another detection device" is a device other than the mobile information processing device 100, has an atmospheric pressure sensor and a temperature sensor, and is generally located in a place different from the mobile information processing device 100. The reference information acquiring module 130 acquires values detected by those sensors. Then, the reference information acquiring module 130 also acquires the altitude of the location where "another detection device" exists. A description of "altitude of the location where another detection device exists" will be given later with reference to FIG. 7 and the like.

The reference information acquiring module 130 may further accept the time at which the "built-in detection device" or "another detection device" detects atmospheric pressure and temperature.

The building information storing module 140 is connected to the elevation determining module 150. The building information storing module 140 at least stores the correspondence between each individual level within a building and the elevation of the corresponding level. Other than this, the building information storing module 140 may store information indicating the name of the building, the location of the building, and the level where the entrance of the building is located. The "elevation of a level" may be either an altitude, or an elevation within a building (for example, an elevation between floors (levels)). For example, the building information storing module 140 stores a building information table 300. FIG. 3 illustrates an exemplary data structure of the building information table 300. The building information table 300 has fields such as a Building ID field 310, a Building Name field 320, a Building Location field 330, an Entrance field 340, a Number of Levels field 350, a Level 1 Elevation field 361, and a Level 2 Elevation field 362. The Building ID field 310 stores information (identification (ID)) that allows a building of interest to be uniquely identified in accordance with the embodiment. The Building Name field 320 stores the name of the building. The Building Location field 330 stores the location of the building. The Building Location field 330 has an X-field 332 and a Y-field 334. The X-field 332 stores latitude. The Y-field 334 stores longitude. The Entrance field 340 stores the level where the entrance of the building is located. If there are entrances on multiple levels, the Entrance field 340 stores the multiple levels. The Number of Levels field 350 stores the total number of levels in the building. The Level 1 Elevation field 361 stores the elevation of Level 1 in the building. The Level 2 Elevation field 362 stores the elevation of Level 2 in the building. Each subsequent field below these fields stores the elevation of each individual level. Therefore, a level with an elevation difference from the level where the entrance is located can be computed.

The building information table 300 within the building information storing module 140 does not need to cover the entirety of a map, but only needs to include data about a place (a building in a predetermined place) for which it is desired to estimate "where" the place is.

The elevation determining module 150 is connected to the atmospheric pressure detecting module 110, the user status detecting module 115, the location detecting module 120, the reference information acquiring module 130, the building information storing module 140, the output module 160, the erroneous determination monitoring module 170, the determination correcting module 180, and the correction information storing module 190. On the basis of an atmospheric pressure, temperature, and altitude accepted by the reference information acquiring module 130, and an atmospheric pressure detected by the atmospheric pressure detecting module 110, the elevation determining module 150 computes the altitude at the time when detection is performed by the atmospheric pressure detecting module 110. Then, the elevation determining module 150 identifies the level corresponding to the computed altitude from the building information storing module 140 that stores the correspondence between each individual level and the elevation of the corresponding level. Of course, the altitude computed by the elevation determining module 150 is the altitude of the location where the mobile information processing device 100 incorporating the atmospheric pressure detecting module 110 is located. Specifically, by using a predetermined equation that takes the atmospheric pressure, temperature, and altitude accepted by the reference information acquiring module 130 as reference values (reference information), the altitude is computed by substituting the atmospheric pressure detected by the atmospheric pressure detecting module 110 into the equation. The "reference information" includes (1) information related to atmospheric pressure, (2) information related to temperature, and (3) information related to altitude.

The elevation determining module 150 may compute altitude by using an atmospheric pressure and temperature accepted by the reference information acquiring module 130 which are detected at a time within a predetermined time range after the time at which the atmospheric pressure detecting module 110 detects atmospheric pressure. For example, the atmospheric pressure and temperature detected within 30 seconds after atmospheric pressure is detected by the atmospheric pressure detecting module 110 may be used.

Further, if there are multiple atmospheric pressures and temperatures within that range, the latest atmospheric pressure and temperature may be used.

A detailed description will be given of how altitude is computed by the elevation determining module 150. Letting $p_{user}$ represent the atmospheric pressure detected by a terminal (the mobile information processing device 100) carried by a user, the elevation $h_{user}$ at which the user is located is expressed by Equation (1) below:

$$h_{user}=153.8*(t0+273.2)*(1-(p_{user}/p0)^{0.1902}) \quad (1)$$

where t0 is the standard temperature, and p0 is the standard atmospheric pressure. p0 and t0 represent the atmospheric pressure and temperature at 0 m above sea level, respectively.

A method of calculating the standard temperature and the standard atmospheric pressure will be described. The method uses information (reference) acquired by the reference information acquiring module 130.

Let $p_{ref}$, $t_{ref}$, and $h_{ref}$ be the atmospheric pressure, temperature, and elevation above sea level (the elevation above sea level, which is known, of the location where "built-in detection device" or "another detection device (for example, the mobile information processing device 250 described later)" is placed) output by the reference information acquiring module 130, respectively. Then, the following equations hold.

$$p0=p_{ref}*(1-0.0065*h_{ref}/(t_{ref}+0.0065*h_{ref}+273.15))^{-5.257} \quad (2)$$

$$t0=t_{ref}+0.0065*h_{ref} \quad (3)$$

Now, the altitude $h_{user}$ of a person carrying the mobile information processing device 100 can be calculated by substituting Equations (2) and (3) into Equation (1), and then substituting the atmospheric pressure $p_{user}$ detected by the atmospheric pressure detecting module 110 into Equation (1).

The output module 160 is connected to the elevation determining module 150. The output module 160 outputs the level identified by the elevation determining module 150. For example, the level may be displayed on a display device such as a liquid crystal display equipped to the information processing device 100, or the name of the building and the level may be displayed on another information processing device together with the name of the carrier of the information processing device 100. In that case, the information processing device 100 may notify the other information processing device of information such as the name of the carrier of the information processing device 100 in advance.

Further, the output module 160 may display, from a database (DB) storing information related to buildings and levels, information corresponding to a building and level of interest (for example, the location of a meeting room or bathroom on that level, or in the case of a department store building, advertisements or the like on the sales floor on that level).

The user status detecting module 115, the erroneous determination monitoring module 170, the determination correcting module 180, and the correction information storing module 190 described below correct the level identified by the elevation determining module 150.

The user status detecting module 115 is connected to the elevation determining module 150. On the basis of the status of the owner of the mobile information processing device 100, the user status detecting module 115 detects on which level the owner is located. As for the "status of the owner", for example, a process equivalent to any one of "six methods for determining the altitude of the mobile information processing device 250, and computing the standard atmospheric pressure and the standard temperature" may be performed. That is, the "mobile information processing device 250" may be read as the "mobile information processing device 100". Specifically, the process may be one of the following: (1) In situations such as when the place where the user is located at a given date and time is previously established, a table storing the correspondence between a date and time, a user, and a place (such as the user's own seat or a meeting room, including the level) where the user is located is prepared in advance, and by using the table, the place (level) where the owner of the mobile information processing device 100 is located at the date and time when atmospheric pressure is detected by the atmospheric pressure detecting module 110 may be extracted. For example, such a table may be generated from user's schedule data; and (2) In a case where the user carries an ID card, and the ID is read by an entry and exit management device as the user enters or exits a floor, a room, or the like to manage where the user is located, the management information may be used to detect the level on which the owner is located.

Of course, the owner (user) of the mobile information processing device 100 can be extracted from the mobile information processing device 100, or the mobile information processing device 100 owned by an owner (user) can be extracted from the owner. For example, a table storing the correspondence between the identification information (mobile ID) of the mobile information processing device 100 and the identification information (user ID) of the owner is prepared in advance, and the table may be used to extract required information.

The erroneous determination monitoring module 170 is connected to the elevation determining module 150. The erroneous determination monitoring module 170 determines whether a difference exists between the level detected by the user status detecting module 115, and the level identified by the elevation determining module 150.

The determination correcting module 180 is connected to the elevation determining module 150. If it is determined by the erroneous determination monitoring module 170 that a difference exists, the determination correcting module 180 corrects the level identified by the elevation determining module 150 by using the level detected by the user status detecting module 115. For example, if the elevation determining module 150 identifies that the user is on Level 14 even through the user is working on a PC from his/her own seat on Level 15 (the user status detecting module 115 detects that the user is on Level 15), the level is corrected to Level 15.

Further, the determination correcting module 180 may, if it is determined by the erroneous determination monitoring module 170 that a difference exists, correct the function used for computing altitude in the elevation determining module 150. Thereafter, the elevation determining module 150 computes altitude by using the function corrected by the determination correcting module 180. The computational function for computing altitude (which may be the computational function for computing the number of levels) itself is changed. Changing the computational function includes, for example, changing the parameters or the like used in Equation (1) (Equations (2) and (3) may be also included) mentioned above, and adding or subtracting "the difference between the level detected by the user status detecting module 115 and the level identified by the elevation determining module 150" (correction value) to or from the number of levels. For example, if the current level is identified as Level 14 even through the user has moved from Level 3 to Level 15, the correction value may be set as +1. Further, the correction value for altitude may be set as, for example, the following value: (altitude difference corresponding to the difference between the level detected by the user status detecting module 115 and the level identified by the elevation determining module 150)/(the number of levels moved).

Further, the determination correcting module 180 may, if it is determined by the erroneous determination monitoring module 170 that a difference exists, correct the level identified by the elevation determining module 150 to the level detected by the user status detecting module 115. For example, the level identified by the elevation determining module 150 is replaced by the level detected by the user status detecting module 115. That is, as occasion demands, the level identified by the elevation determining module 150 is corrected to the level detected by the user status detecting module 115.

The correction information storing module 190 is connected to the elevation determining module 150. The correction information storing module 190 stores a function (including a correction value) corrected by the determination correcting module 180. The elevation determining module 150 identifies a level by using the corrected function.

Further, the output module 160 may, if it is determined by the erroneous determination monitoring module 170 that a difference exists, output the level that has been corrected by the determination correcting module 180. If it is determined by the erroneous determination monitoring module 170 that a difference does not exist (if the two levels are the same), the output module 160 outputs the level identified by the elevation determining module 150 (or the level detected by the user status detecting module 115).

The user status detecting module 115 may detect, after a level is output by the output module 160, whether the mobile information processing device 100 has moved. For example, this determination is made by using the output value of an acceleration sensor, GPS, or the like. The expression "after a level is output by the output module 160" indicates that a level identification process has been executed at least once. That is, whether the mobile information processing device 100 has moved is determined after the last level identification process is executed. If the mobile information processing device 100 has not moved, then there has been no change of the level.

The elevation determining module 150 may not perform the computing if it is determined by the user status detecting module 115 that there has been no movement.

Further, the determination correcting module 180 may, if the user status detecting module 115 detects that there has been no movement, correct the level identified by the elevation determining module 150, by using the level output by the output module 160. In this case, the computation process by the elevation determining module 150 is performed even though the mobile information processing device 100 has not moved after the last level identification process is executed. This is to deal with errors or the like caused by atmospheric pressure fluctuations. That is, the elevation determining module 150 is caused to perform the computing in order to correct the computational function.

Referring to FIGS. 2 to 10, a description will be given of a process executed in a case where the user status detecting module 115, the erroneous determination monitoring module 170, the determination correcting module 180, and the correction information storing module 190 are not provided. That is, the process up to when a correction is made will be described.

FIG. 2 illustrates an exemplary system configuration for implementing the embodiment. Portions similar to those of the mobile information processing device 100 illustrated in the example of FIG. 1 are denoted by the same reference signs, and a repetitive description of these portions is omitted.

A mobile information processing device 200 has the atmospheric pressure detecting module 110, the location detecting module 120, the output module 160, and a communication module 205. The mobile information processing device 200 represents another mode of configuration of the mobile information processing device 100 illustrated in FIG. 1. In this regard, the mobile information processing device 100 is a combination of the mobile information processing device 200 and a location determination processing device 220. The atmospheric pressure detecting module 110 is connected to the communication module 205. The location detecting module 120 is connected to the communication module 205. The output module 160 is connected to the communication module 205. The communication module 205, which is connected to the atmospheric pressure detecting module 110, the location detecting module 120, and the output module 160, is also connected via a communication line 290 to a communication module 225 of the location determination processing device 220 and to a communication module 275 of the mobile information processing device 250.

The communication module 205 transmits an atmospheric pressure detected by the atmospheric pressure detecting module 110, and a location detected by the location detecting module 120 to the location determination processing device 220 via the communication line 290. Further, the communication module 205 receives information (location, building name, level, and information related to location (the location of the meeting room, advertisements, and the like described above)) transmitted from the location determination processing device 220, and causes the output module 160 to output the received information.

The location determination processing device 220 has the building information storing module 140, the elevation determining module 150, the communication module 225, and an output module 230. The location determination processing device 220 represents another mode of configuration of the mobile information processing device 100 illustrated in the example of FIG. 1. The building information storing module 140 is connected to the elevation determining module 150. The elevation determining module 150 is connected to the building information storing module 140, the communication module 225, and the output module 230. The communication module 225, which is connected to the elevation determining module 150, is also connected via the communication line 290 to the communication module 205 of the mobile information processing device 200, and to the communication module 275 of the mobile information processing device 250. The output module 230 is connected to the elevation determining module 150.

The communication module 225 accepts an atmospheric pressure, location, and detection time transmitted from the mobile information processing device 200, and an atmospheric pressure, location, and detection time transmitted from the mobile information processing device 250, via the communication line 290. The elevation determining module 150 identifies the level where the carrier of the mobile information processing device 200 is located, and the output module 230 outputs the result. For example, the place where the carrier of the mobile information processing device 200 is located may be indicated on a map. Further, the communication module 225 may transmit the location of the carrier of the mobile information processing device 200 to the mobile information processing device 200 or the mobile information processing device 250 via the communication line 290.

The mobile information processing device 250 has an atmospheric pressure detecting module 255, a temperature detecting module 260, a location detecting module 265, the communication module 275, and an output module 280. There may be multiple mobile information processing devices 250. The mobile information processing device 250 is "another detection device" described above with reference to the example of FIG. 1. The atmospheric pressure detecting module 255 is connected to the communication module 275. The temperature detecting module 260 is connected to the communication module 275. The location detecting module 265 is connected to the communication module 275. The communication module 275, which is connected to the atmospheric pressure detecting module 255, the temperature detecting module 260, the location detecting module 265, and the output module 280, is also connected via the communication line 290 to the communication module 205 of the mobile information processing device 200, and to the communication module 225 of the location determination processing device 220. The output module 280 is connected to the communication module 275.

The atmospheric pressure detecting module 255 detects the atmospheric pressure at the location where the mobile information processing device 250 exists. The atmospheric pressure detecting module 255 is a so-called atmospheric pressure sensor.

The temperature detecting module 260 detects the temperature at the location where the mobile information processing device 250 exists. The temperature detecting module 260 is a so-called temperature sensor.

The location detecting module 265 detects the location where the mobile information processing device 250 is located. The location detecting module 265 corresponds to, for example, a GPS, or a location detecting module for base stations (for example, a 3G base station and a WiFi base station) in wireless communication networks.

The communication module 275 transmits the atmospheric pressure detected by the atmospheric pressure detecting module 255, the temperature detected by the temperature detecting module 260, the altitude of the location where the mobile information processing device 250 exists, and the detection time to the location determination processing device 220 via the communication line 290. Then, the communication module 275 receives the location of the carrier of the mobile information processing device 200 from the location determination processing device 220, and the output module 280 outputs the result. For example, the place where the carrier of the mobile information processing device 200 is located may be indicated on a map.

FIG. 4 is a flowchart illustrating exemplary processing according to the embodiment.

In step S402, the location detecting module 120 acquires GPS information and base station location information, and the atmospheric pressure detecting module 110 acquires atmospheric pressure information. The information to be acquired may be only one of GPS information and base station location information.

In step S404, the location detecting module 120 determines whether GPS information has been detected. The processing proceeds to step S406 if GPS information has been detected. Otherwise, the processing proceeds to step S408.

In step S406, the location detecting module 120 determines the horizontal location (latitude/longitude) and extent (the distance of the radius, or the like) from the GPS information.

In step S408, the location detecting module 120 determines whether a base station location has been detected. The processing proceeds to step S410 if a base station location has been detected. Otherwise, the processing proceeds to step S412.

In step S410, the location detecting module 120 determines the horizontal location and extent from the base station location information.

In step S412, the location detecting module 120 determines the horizontal location and extent from the time series data of GPS information and base station location information. As described above, the immediately previous GPS information and base station location information may be used, or time series data may be used to determine the horizontal location and extent.

In step S414, the location detecting module 120 determines whether the location information has sufficient precision. The processing proceeds to step S418 if the location information has sufficient precision. Otherwise, the processing proceeds to step S416. The determination of whether the location information has sufficient precision is made by comparing the precision of the information acquired in step S402 with a predetermined value. For example, even if GPS information has been detected, if the detected information does not have sufficient precision, the processing proceeds to step S416. At this time, when proceeding from step S412, the processing proceeds to step S416.

In step S416, a level within a building is identified. A detailed description of this process will be given later with reference to the flowchart illustrated in FIG. 5.

In step S418, the output module 160 outputs where the mobile information processing device 100 is located. For example, the name of the building, and the level are displayed on a display device.

FIG. 5 illustrates exemplary processing according to the embodiment.

In step S502, the reference information acquiring module 130 acquires atmospheric pressure information that serves as a reference. In the example illustrated in FIG. 2, this corresponds to the atmospheric pressure detected by the atmospheric pressure detecting module 255 of the mobile information processing device 250.

In step S504, the reference information acquiring module 130 acquires temperature information that serves as a reference. In the example illustrated in FIG. 2, this corresponds to the temperature detected by the temperature detecting module 260 of the mobile information processing device 250.

In step S506, the elevation determining module 150 computes standard atmospheric pressure. Equation (2) mentioned above is used.

In step S508, the elevation determining module 150 computes standard temperature. Equation (3) mentioned above is used.

In step S510, the atmospheric pressure detecting module 110 detects atmospheric pressure.

In step S512, the elevation determining module 150 computes elevation (altitude). The results of steps S506, S508, and S510 are substituted into Equation (1) mentioned above.

In step S514, the elevation determining module 150 identifies a level within the building by using data stored in the building information storing module 140. That is, the elevation determining module 150 determines the level matching the elevation computed in step S512. As for the meaning of the term "matching" as used herein, the elevation computed in step S512 may be compared with the elevation stored in the Level 1 Elevation field 361 or the like, and the level for which the difference between the two elevations is the smallest may be adopted as this level. If the difference does not fall within a predetermined range of values, this may be regarded as an error.

In step S516, the output module 160 outputs the location (level) identified in step S514.

FIG. 6 illustrates an exemplary data structure of a measurement/identification results table 600. The measurement/identification results table 600 is data used by the elevation determining module 150. The measurement/identification results table 600 represents the actual experimental results. That is, "another detection device (the mobile information processing device 250)" that serves as a reference was placed on Level 15, and the user moved to Level 3 and Level 10 while carrying the mobile information processing device 100 and measured the corresponding atmospheric pressures p. When the processing mentioned above is performed to identify the levels on which the user was at the respective times, the levels are identified as Level 3 and Level 10. This indicates that the user carrying the mobile information processing device 100, who had been on Level 3 at 16:45:24, moved to Level 10 at 16:47:37. Thus, the data in a Measurement Floor field 644 and the data in an Estimated Floor field 654 match, indicating that the levels have been identified accurately.

It is to be noted that the Measurement Floor field 644 is data used for the purpose of an experiment, and is not required for the embodiment.

The measurement/identification results table 600 has a Time field 610, a Reference field 620, a User field 640, and a Calculation Results field 650.

The Reference field 620 has a Data Measured on 15F field 622, and a Calculations from 15F Data field 624.

The Data Measured on 15F field 622, which stores data accepted by the reference information acquiring module 130, has a Measured Atmospheric Pressure field 626, an Elevation field 628, and a Measured Temperature field 630.

The Calculations from 15F Data field 624, which stores data computed by Equations (2) and (3), has a p0 field 632, and a t0 field 634.

The User field 640 has a Measured Atmospheric Pressure field 642, and the Measurement Floor field 644. The Measured Atmospheric Pressure field 642 stores an atmospheric pressure detected by the atmospheric pressure detecting module 110.

The Calculation Results field 650 has an Elevation field 652, and the Estimated Floor field 654. The Elevation field 652 stores the altitude computed by Equation (1). The Estimated Floor field 654 stores the level corresponding to the altitude.

This embodiment requires atmospheric pressure and temperature data from the mobile information processing device 250 with a known altitude. Six methods for determining the altitude of the mobile information processing device 250, and computing standard atmospheric pressure and standard temperature will be described below. It is assumed that the person carrying the mobile information processing device 200 is in the same building as the person carrying the mobile information processing device 250.

(1) Activity Pattern

By keeping track of the daily activity pattern of the mobile information processing device 250, on which floor the mobile information processing device 250 is located at what time is identified, and the altitude of that floor is used. That is, the altitude of the mobile information processing device 250 is determined on the basis of the activity pattern of the user carrying the mobile information processing device 250. Once the floor is successfully identified, and atmospheric pressure and temperature are acquired from the mobile information processing device 250, the standard atmospheric pressure p0 and the standard temperature t0 can be computed from Equations (2) and (3).

Figure 7:
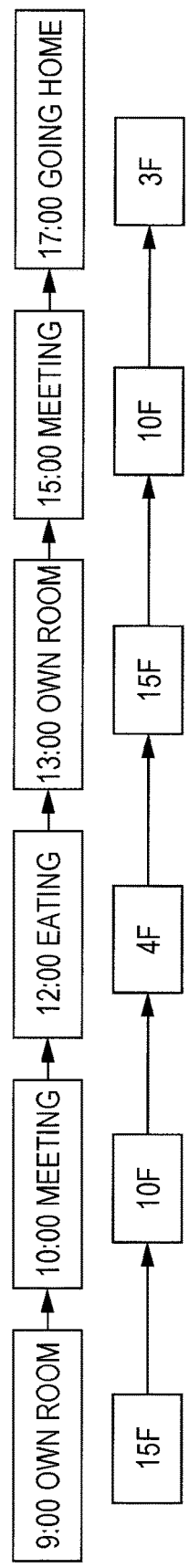
FIG. 7 illustrates an exemplary process for computing values that serve as a reference.

FIG. 7 illustrates an exemplary process for computing values that serve as a reference. A fixed daily activity pattern of the user carrying the mobile information processing device 250 is used to identify the level where the user is located at each time of day. For example, it is assumed from past activities of the user that the user follows the activity pattern as illustrated in FIG. 7. In this case, the following tables are prepared: Table A storing the correspondence between time and place; Table B storing the correspondence between place and floor; and Table C storing the correspondence between floor and altitude. The place at the time of detection of temperature or atmospheric pressure is extracted from Table A, and from the place, the floor is extracted from Table B. From the floor, the altitude is extracted from Table C to identify the altitude of the mobile information processing device 250, which is then delivered to the reference information acquiring module 130. For example, if atmospheric pressure or the like is detected at 13:32, it can be identified by using Tables A, B, and C that the user is in the user's own room, the user's own room is located on Level 15, and the altitude of Level 15 is 77 m, respectively.

(2) Schedule

The altitude of the mobile information processing device 250 is determined on the basis of the schedule of the user carrying the mobile information processing device 250 and the time at which detection is performed. In coordination with the operation of a program called a scheduler, the floor on which the mobile information processing device 250 is located at a specific time on a specific day is identified. Once the floor is successfully identified, and atmospheric pressure and temperature are acquired from the mobile information processing device 250, the standard atmospheric pressure p0 and the standard temperature t0 can be computed from Equations (2) and (3).

Figure 8:
FIG. 8 illustrates an exemplary process for computing values that serve as a reference.

FIG. 8 illustrates an exemplary process for computing values that serve as a reference. As illustrated in the example in FIG. 8, a date and time, and a place (for example, an indication of being present in a hall (Level 4) of a given building from 15 h to 17 h on Aug. 6, 2012) are acquired from the scheduler, and if the time at which temperature and atmospheric pressure are detected falls within this time period, the place is extracted from Table A, the corresponding floor is extracted from the place from Table B, and the corresponding altitude is extracted from the floor from Table C to thereby identify the altitude of the mobile information processing device 250, which is then delivered to the reference information acquiring module 130. For example, if atmospheric pressure or the like is detected at 15:32, it can be identified by using the scheduler that the user is present in a hall, and further, it can be identified by using Table B and Table C that the hall is located on Level 4, and that the altitude of the Level 4 is 27 m, respectively. The scheduler may be built in the mobile information processing device 250, or may exist within another information processing device (for example, the location determination processing device 220). If a scheduler that exists within another information processing device is to be used, the user carrying the mobile information processing device 250 may be retrieved from data managed by the scheduler.

(3) Statistical Representative Value

Figure 9:
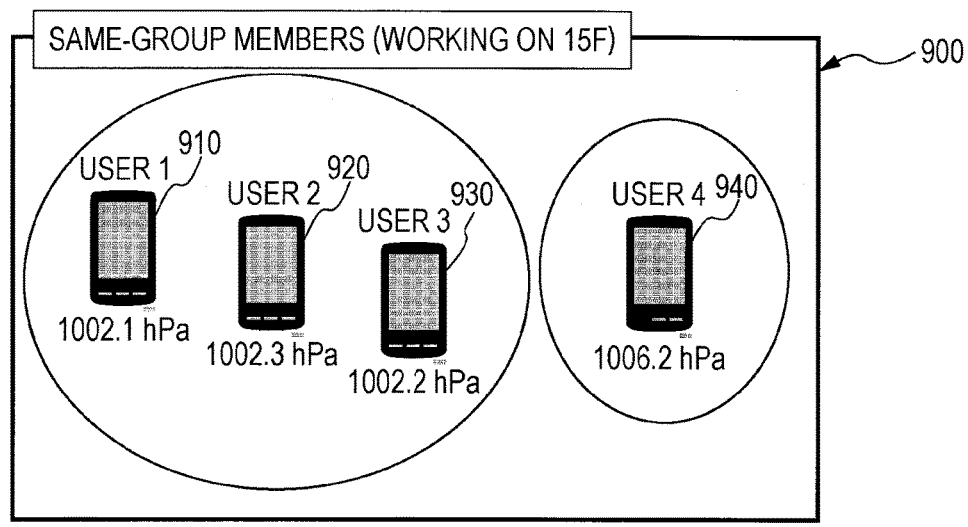
FIG. 9 illustrates an exemplary process for computing values that serve as a reference.

FIG. 9 illustrates an exemplary process for computing values that serve as a reference.

As same-group members (who work on 15F) 900, there are users carrying a mobile information processing device 910, a mobile information processing device 920, a mobile information processing device 930, and a mobile information processing device 940. Multiple users for whom the floor on which the users work are known are extracted, and the values of atmospheric pressure detected by the multiple mobile information processing devices 250 carried by the multiple users are used to provide the atmospheric pressure for that floor. For example, if atmospheric pressures detected by the mobile information processing devices 250 of three persons out of the four persons are close to each other, the mean of the atmospheric pressures detected by the mobile information processing devices 250 of the three persons is transmitted to the reference information acquiring module 130 of the mobile information processing device 100. In this regard, "atmospheric pressures that are close to each other" may be atmospheric pressures falling within the range of the elevation of the same floor. For example, if a floor has an elevation of 4.5 m, atmospheric pressures within a range of 0.54 hPa of each other may be determined to indicate the presence on the same floor (1 m=0.12 hPa). For "extraction of multiple users for whom the floor on which the users work are known", the method according to (1), (2), or the like may be employed. That is, if there is any user who is not acting in accordance with his/her activity pattern or schedule, the atmospheric pressure or the like detected by the mobile information processing device 250 carried by the user is not used. Further, in this way, the problem of errors in atmospheric pressure and the like detected by individual mobile information processing devices 250 is also addressed.

Accordingly, the reference information acquiring module 130 accepts multiple atmospheric pressures, temperatures, and altitudes. Then, on the basis of an atmospheric pressure, a temperature, and an altitude that are obtained as statistical representative values of the multiple atmospheric pressures, temperature, and altitudes accepted by the reference information acquiring module 130, and an atmospheric pressure detected by the atmospheric pressure detecting module 110, the elevation determining module 150 computes the altitude at the time when the atmospheric pressure is detected by the atmospheric pressure detecting module 110. Other than the mean, a value such as the mode or median may be used as a statistical representative value.

(4) Activity Recognition

The altitude of the mobile information processing device 250 is determined on the basis of the results of recognizing an activity of a user (who may be an individual or multiple persons) carrying the mobile information processing device 250. User's activities such as sitting on a chair, standing up, walking, and being engaged in a meeting can be determined by using values or the like detected by, for example, an acceleration sensor equipped in the mobile information processing device 250, or by, for example, image, video, and audio acquisition means. A known technique is employed for this technique. For example, if there are people located within a predetermined area, and multiple persons are sitting on a chair and one person is standing, it is determined that the user is being engaged in a meeting.

Figure 10:
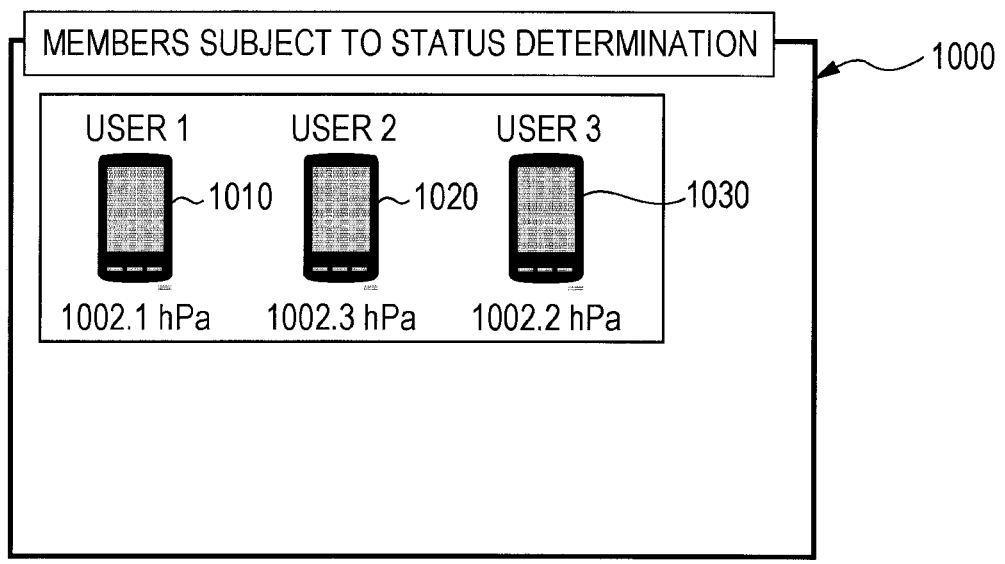
FIG. 10 illustrates an exemplary process for computing values that serve as a reference.

FIG. 10 illustrates an exemplary process for computing values that serve as a reference. If it is determined that users carrying a mobile information processing device 1010, a mobile information processing device 1020, and a mobile information processing device 1030 are currently engaged in a meeting, and the space that can be used for meeting only exists on Level 15, it is determined that these users are located on Level 15. That is, atmospheric pressure or the like is detected at a given time of day, and activity recognition is performed to find as a result that the user or users are "engaged in a meeting". Then, it can be identified by using Table B and Table C that the meeting room is located on Level 15, and that the altitude of Level 15 is 77 m, respectively.

(5) Desktop PC

If a user carrying the mobile information processing device 250 has used a stationary information processing device (for example, a desktop PC), which is an information processing device that is fixed in position, the altitude of the location where the stationary information processing device is installed is determined as the altitude of the mobile information processing device 250. For example, at login to a desktop PC for which the floor where the desktop PC is located is known, the user is identified from login information, and the atmospheric pressure and temperature detected by the mobile information processing device 250 carried by the user are used. More specifically, the following tables are used: Table D storing the correspondence between a desktop PC (IP address) and the floor on which the desktop PC is installed; Table E storing the correspondence between a user name and the mobile information processing device 250 carried by the corresponding user; and Table C mentioned above. For example, if, upon login to a desktop PC by a user, it is found that a keyboard or the like is being used, the mobile information processing device 250 carried by the user is identified by using Table E, and when the mobile information processing device 250 detects atmospheric pressure or the like, the floor is identified by using Table D and the altitude is identified by using Table C.

(6) Entry and Exit Management Device

When a user carrying the mobile information processing device 250 passes through an entry and exit management device, the altitude of the location where the entry and exit management device is installed is determined as the altitude of the mobile information processing device 250. An example of such an entry and exit management device is one that manages opening and closing of a door by means such as reading of an IC card or authentication using biometrics technologies. Table F is prepared in advance, which stores the correspondence between an entry and exit management device and the altitude of the location where the entry and exit management device is installed. A user who has passed through the entry and exit management device is identified, the mobile information processing device 250 carried by the user is identified by using Table E, and the altitude of the entry and exit management device is extracted by using Table F and used as the altitude of the mobile information processing device 250. For example, this method may be used for cases in which the entry and exit management device is installed on each floor. Further, the atmospheric pressure detecting module 255 of the mobile information processing device 250 may detect atmospheric pressure or the like at the point in time when the user passes through the entry and exit management device.

After the user passes through the entry and exit management device, the altitude of the mobile information processing device 250 is determined on the basis of a change in the atmospheric pressure detected by the atmospheric pressure detecting module 255 included in the mobile information processing device 250, and the altitude of the location where the entry and exit management device is installed. For example, the atmospheric pressure detecting module 255 is activated at the point in time when the user passes through the entry and exit management device, and the subsequent fluctuations in atmospheric pressure are recorded. The distance moved in the direction of higher or lower elevation is computed from the amount of fluctuation in atmospheric pressure, and how many levels the user has moved up or moved down is computed, thus allowing a floor to be identified. Information on the identified floor is updated sequentially so that the next time the user moves to another floor, the distance moved is computed in the same manner to identify the floor.

The phrase "a change in the atmospheric pressure" refers to the difference between Atmospheric Pressure A detected at the time of passage through the entry and exit management device, and Atmospheric Pressure B detected at the current time. The difference in elevation (altitude difference) is computed from the difference in atmospheric pressure, and the result is added to or subtracted from the altitude of the location where the entry and exit management device is installed, thereby computing the altitude of the mobile information processing device. The determination as to whether to perform an addition or subtraction may be made as follows. That is, a subtraction is performed if the difference obtained by subtracting Atmospheric Pressure B from Atmospheric Pressure A is negative (if the user has moved to a lower level), and an addition is performed if the difference obtained by subtracting Atmospheric Pressure B from Atmospheric Pressure A is positive (if the user has moved to a higher level).

The processing described with reference to FIGS. 2 to 10 (the mobile information processing device 100 that does not have the user status detecting module 115, the erroneous determination monitoring module 170, the determination correcting module 180, and the correction information storing module 190) may be subject to erroneous determinations described below.

(1) Atmospheric pressure information that is initially acquired and information related to registered levels are used as initial values, and then the subsequent movements between floors are determined. Consequently, once an erroneous determination is made, then erroneous determinations ensue.

(2) Atmospheric pressure information is affected by weather such that even when there has been no movement between floors, it is sometimes erroneously determined that there has been a movement between floors.

That is, there is no mechanism for error determination and feedback.

Accordingly, the user status detecting module 115, the erroneous determination monitoring module 170, the determination correcting module 180, and the correction information storing module 190 are added to the mobile information processing device 100. The flowcharts depicted in FIGS. 11 and 12 mainly illustrate the processing executed by the user status detecting module 115, the erroneous determination monitoring module 170, the determination correcting module 180, and the correction information storing module 190.

Figure 11:
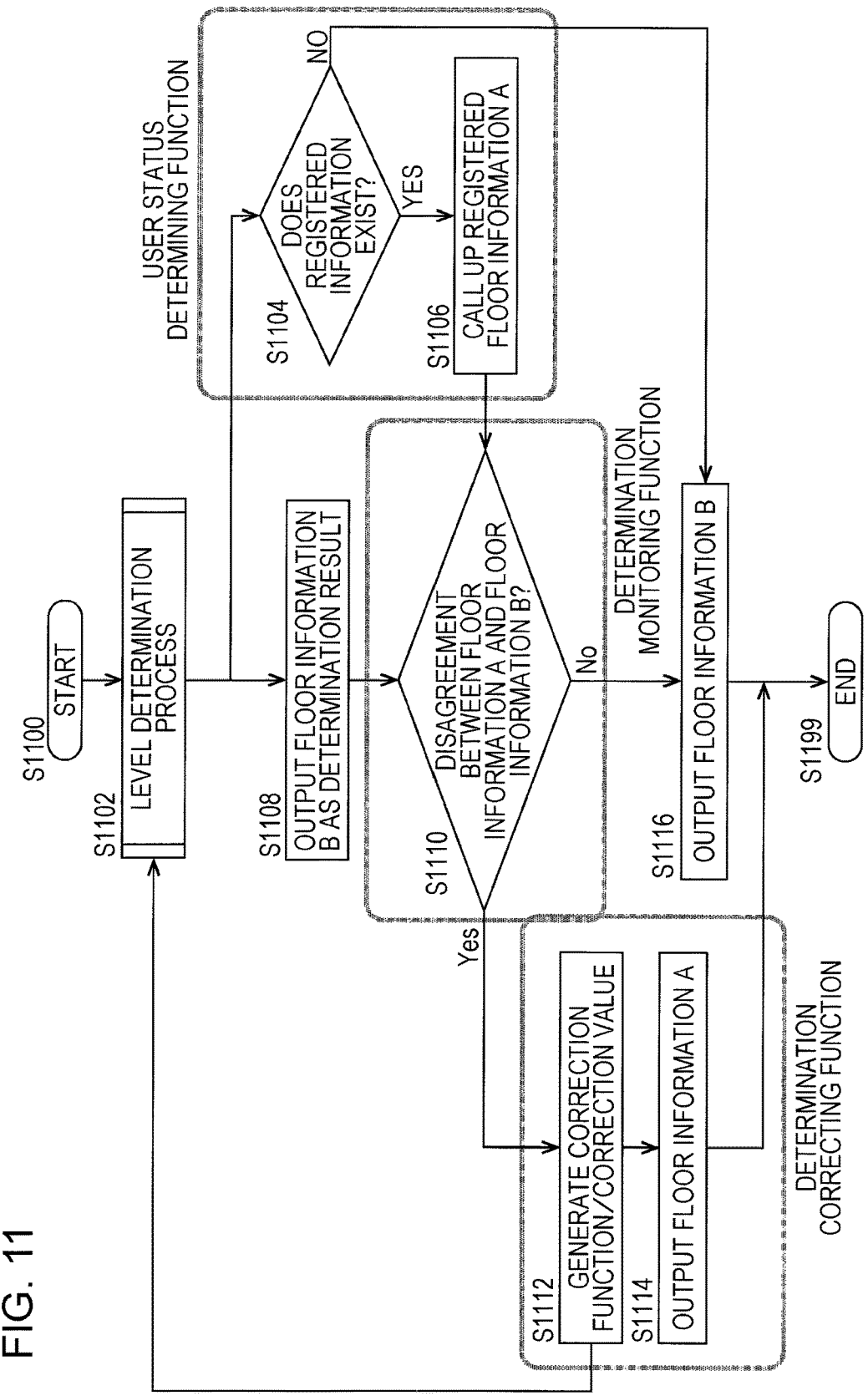
FIG. 11 is a flowchart illustrating exemplary processing according to the embodiment.

FIG. 11 is a flowchart illustrating exemplary processing according to the embodiment. Step S1104 and step S1110 are responsible for a user status determining function, step S1106 is responsible for a determination monitoring function, and step S1112 and step S1114 are responsible for a determination correcting function.

In step S1102, a level determination process is executed. This corresponds to the processing described above with reference to FIGS. 2 to 10.

In step S1104, the user status detecting module 115 determines whether registered information exists. If registered information exists, the processing proceeds to step S1106. Otherwise, the processing proceeds to step S1116. In this regard, registered information refers to information related to "the status of the owner of the mobile information processing device 100" mentioned above. Specifically, the registered information is schedule data or the like.

In step S1106, the user status detecting module 115 calls up registered Floor Information A. That is, Floor Information A of the owner of the mobile information processing device 100 (the level on which the owner is located) is extracted from the registered information.

In step S1108, the output module 160 outputs Floor Information B as a determination result. The processing in step S1108 may not be performed.

In step S1110, the erroneous determination monitoring module 170 determines whether there is disagreement between Floor Information A and Floor Information B, and if there is disagreement (if Floor Information A and Floor Information B differ), the processing proceeds to step S1112. Otherwise, the processing proceeds to step S1116.

In step S1112, the determination correcting module 180 generates a correction function/correction value. For example, Floor Information A is changed to Floor Information B. Alternatively, a correction value is added to or subtracted from Floor Information A. Then, the computational function used by the elevation determining module 150 is corrected.

In step S1114, the output module 160 outputs Floor Information A. The information output at this time is Floor Information A that has been corrected.

In step S1116, the output module 160 outputs Floor Information B. Since Floor Information A and Floor Information B are the same, Floor Information A may be output.

Figure 12:
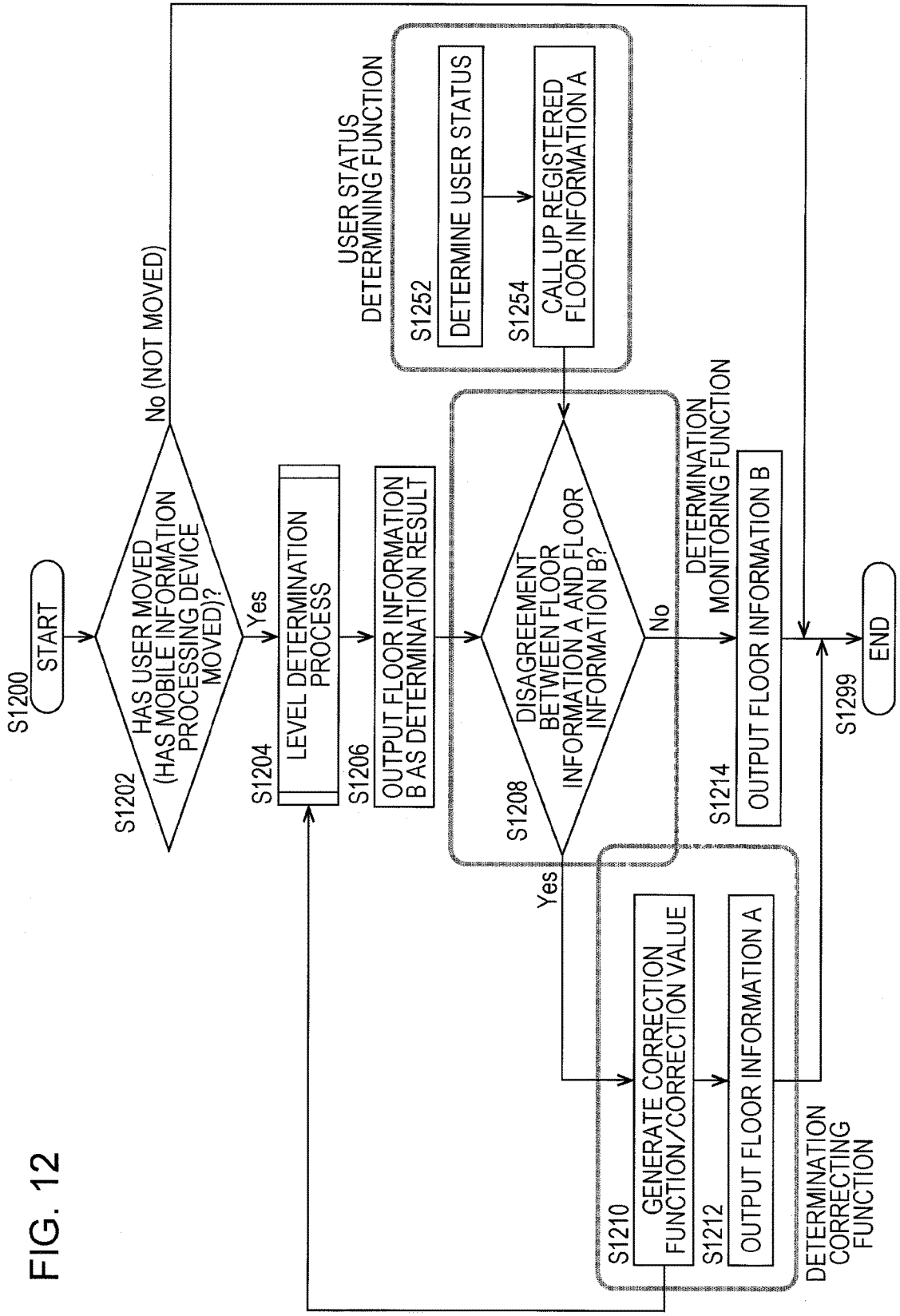
FIG. 12 is a flowchart illustrating exemplary processing according to the embodiment.

FIG. 12 is a flowchart illustrating exemplary processing according to the embodiment. Step S1252 and step S1254 are responsible for a user status determining function, step S1208 is responsible for a determination monitoring function, and step S1210 and step S1212 are responsible for a determination correcting function.

In step S1202, the user status detecting module 115 determines whether the user has moved (whether the mobile information processing device 100 has moved). The processing proceeds to step S1204 if the user has moved, and the processing ends if the user has not moved (step S1299).

In step S1204, a level determination process is executed. This corresponds to the processing described above with reference to FIGS. 2 to 10.

In step S1206, the output module 160 outputs Floor Information B as a determination result. The processing in step S1206 may not be performed.

In step S1252, the user status detecting module 115 determines user status. The user status detecting module 115 executes the above-mentioned processing to determine user status from schedule data or the like.

In step S1254, the user status detecting module 115 calls up registered Floor Information A for the above-mentioned state. That is, the level corresponding to the user status (the place where the user is located) is extracted.

In step S1208, the erroneous determination monitoring module 170 determines whether there is disagreement between Floor Information A and Floor Information B, and if there is disagreement (if Floor Information A and Floor Information B differ), the processing proceeds to step S1210. Otherwise, the processing proceeds to step S1214.

In step S1210, the determination correcting module 180 generates a correction function/correction value. For example, Floor Information A is changed to Floor Information B. Alternatively, a correction value is added to or subtracted from Floor Information A. Then, the computational function used by the elevation determining module 150 is corrected.

In step S1212, the output module 160 outputs Floor Information A. The information output at this time is Floor Information A that has been corrected.

In step S1214, the output module 160 outputs Floor Information B. Since Floor Information A and Floor Information B are the same, Floor Information A may be output.

The embodiment may be implemented as the mobile information processing device 200, as well as the location determination processing device 220 that is a server. Accordingly, the mobile information processing device 100, the mobile information processing device 200, and the location determination processing device 220 that is a server may be understood as follows. An information processing device including: an accepting module that accepts reference information, the reference information including information related to atmospheric pressure and information related to temperature detected by a detection device and information related to altitude detected by the detection device; an atmospheric pressure information accepting module that accepts information related to atmospheric pressure for a location where an information processing device that is mobile exists; a computing module that computes an altitude, on a basis of the reference information accepted by the accepting module and the information related to atmospheric pressure accepted by the atmospheric pressure information accepting module; an identifying module that identifies, from a storing module that stores a correspondence between a level and an elevation of the level, a level corresponding to the altitude computed by the computing module; a detecting module that detects, on a basis of a status of an owner of the mobile information processing device, a level on which the owner is located; a determining module that determines whether a difference exists between the level detected by the detecting module and the level identified by the identifying module; a correcting module that, if it is determined by the determining module that a difference exists, corrects the level identified by the identifying module, by using the level detected by the detecting module; and an output module that, if it is determined by the determining module that a difference exists, outputs the level corrected by the correcting module.

Accordingly, if the embodiment is implemented as the location determination processing device 220 that is a server, when it is desired to use the functions according to the embodiment from the mobile information processing device side, an atmospheric pressure detected by the mobile information processing device may be transmitted to the location determination processing device 220 that is a server. That is, an atmospheric pressure is detected at the mobile information processing device, and the detected atmospheric pressure is accepted at the location determination processing device 220.

While the elevation determining module 150 is included in the mobile information processing device 100 or the location determination processing device 220 in the above description, altitude may be computed by an information processing device other than these. Therefore, cases where the elevation determining module 150 "accepts the result of computing an altitude" include both when the elevation determining module 150 that exists in the mobile information processing device 100 or in the location determination processing device 220 computes an altitude, and when the elevation determining module 150 accepts an altitude computed by another information processing device. Likewise, a level may be identified by another information processing device. Therefore, cases where the elevation determining module 150 "accepts the result of identifying a level" include both when the elevation determining module 150 that exists in the mobile information processing device 100 or in the location determination processing device 220 identifies a level, and when the elevation determining module 150 accepts a level identified by another information processing device.

While the user status detecting module 115 is included in the mobile information processing device 100 or the location determination processing device 220 in the above description, a level on which a user is located may be detected by an information processing device other than these, on the basis of the status of the user. Therefore, cases where the user status detecting module 115 "accepts the result of detecting a level" include both when the user status detecting module 115 that exists in the mobile information processing device 100 or in the location determination processing device 220 detects a level, and when the user status detecting module 115 accepts a level detected by another information processing device.

While the erroneous determination monitoring module 170 is included in the mobile information processing device 100 or the location determination processing device 220 in the above description, the determination as to whether two levels differ may be made by an information processing device other than these. Therefore, cases where the erroneous determination monitoring module 170 "accepts the result of determining whether a difference exists between the levels" include both when the erroneous determination monitoring module 170 that exists in the mobile information processing device 100 or in the location determination processing device 220 makes the determination, and when the erroneous determination monitoring module 170 accepts the result of determination made by another information processing device.

The above-mentioned embodiment may be understood as the invention as described below.

(A)

An information processing device comprising:

an accepting section that accepts an atmospheric pressure and a temperature detected by another detection device, and an altitude at which the other detection device is located;

an atmospheric pressure detecting section that detects an atmospheric pressure at a location where an information processing device that is mobile exists;

a computing section that computes an altitude at a time when detection is performed by the atmospheric pressure detecting section, on a basis of the atmospheric pressure, the temperature, and the altitude accepted by the accepting section and the atmospheric pressure detected by the atmospheric pressure detecting section;

an identifying section that identifies, from a storing section that stores a correspondence between a level and an elevation of the level, a level corresponding to the altitude computed by the computing section;

a detecting section that detects, on a basis of a status of an owner of the mobile information processing device, a level on which the owner is located;

a determining section that determines whether a difference exists between the level detected by the detecting section and the level identified by the identifying section;

a correcting section that, if it is determined by the determining section that a difference exists, corrects the level identified by the identifying section, by using the level detected by the detecting section; and an outputting section that, if it is determined by the determining section that a difference exists, outputs the level corrected by the correcting section.

(B)

The information processing device according to (A), wherein:

the correcting section corrects a function used for computation by the computing section, if it is determined by the determining section that a difference exists; and the computing section computes an altitude by using the function corrected by the correcting section.

(C)

The information processing device according to (A), wherein:

the correcting section corrects the level identified by the identifying section to the level detected by the detecting section, if it is determined by the determining section that a difference exists.

(D)

The information processing device according to any one of (A) to (C), wherein:

the detecting section detects, after a level is output by the outputting section, whether the mobile information processing device has moved; and the computing section does not perform the computing if it is detected by the detecting section that there has been no movement.

(E)

The information processing device according to any one of (A) to (C), wherein:

the detecting section detects, after a level is output by the outputting section, whether the mobile information processing device has moved; and the correcting section corrects the level identified by the identifying section, by using the level output by the outputting section, if it is detected by the detecting section that there has been no movement.

(F)

The information processing device according to any one of (A) to (E), wherein:

the accepting section accepts a time at which the other detection device detects an atmospheric pressure and a temperature; and the computing section computes an altitude by using an atmospheric pressure and a temperature accepted by the accepting section which are detected at a time within a predetermined time range after a time at which an atmospheric pressure is detected by the atmospheric pressure detecting section.

(G)

The information processing device according to any one of (A) to (E), wherein the other detection device is an information processing device that is mobile, and an altitude of the information processing device is determined on a basis of an activity pattern of a person carrying the information processing device.

(H)

The information processing device according to any one of (A) to (E), wherein the other detection device is an information processing device that is mobile, and an altitude of the information processing device is determined on a basis of a schedule of a person carrying the information processing device and a time at which detection is performed.

(I)

The information processing device according to any one of (A) to (E), wherein:

the other detection device comprises a plurality of information processing devices that are mobile;

the accepting section accepts a plurality of atmospheric pressures, a plurality of temperatures, and a plurality of altitudes; and the computing section computes an altitude at a time when detection is performed by the atmospheric pressure detecting section, on a basis of an atmospheric pressure, a temperature, and an altitude that are respectively statistical representative values of the plurality of atmospheric pressures, the plurality of temperatures, and the plurality of altitudes accepted by the accepting section, and the atmospheric pressure detected by the atmospheric pressure detecting section.

(J)

The information processing device according to any one of (A) to (E), wherein the other detection device is an information processing device that is mobile, and an altitude of the information processing device is determined on a basis of a result of recognizing an activity of a person carrying the information processing device.

(K)

The information processing device according to any one of (A) to (E), wherein the other detection device is an information processing device that is mobile, and if a person carrying the information processing device has used a stationary information processing device, an altitude of a location where the stationary information processing device is installed is determined as an altitude of the mobile information processing device, the stationary information processing device being an information processing device that is fixed in position.

(L)

The information processing device according to any one of (A) to (E), wherein the other detection device is an information processing device that is mobile, and if a person carrying the information processing device has passed through an entry and exit management device, an altitude of a location where the entry and exit management device is installed is determined as an altitude of the information processing device.

(M)

The information processing device according to (L), wherein after passage through the entry and exit management device, the other detection device determines an altitude of the information processing device on a basis of a change in an atmospheric pressure detected by an atmospheric pressure detecting section provided in the mobile information processing device, and the altitude of the location where the entry and exit management device is installed.

(N)

An information processing program for causing a computer to function as:

an accepting section that accepts an atmospheric pressure and a temperature detected by another detection device, and an altitude at which the other detection device is located;

an atmospheric pressure detecting section that detects an atmospheric pressure at a location where an information processing device that is mobile exists;

a computing section that computes an altitude at a time when detection is performed by the atmospheric pressure detecting section, on a basis of the atmospheric pressure, the temperature, and the altitude accepted by the accepting section and the atmospheric pressure detected by the atmospheric pressure detecting section;

an identifying section that identifies, from a storing section that stores a correspondence between a level and an elevation of the level, a level corresponding to the altitude computed by the computing section;

a detecting section that detects, on a basis of a status of an owner of the mobile information processing device, a level on which the owner is located;

a determining section that determines whether a difference exists between the level detected by the detecting section and the level identified by the identifying section;

a correcting section that, if it is determined by the determining section that a difference exists, corrects the level identified by the identifying section, by using the level detected by the detecting section; and an outputting section that, if it is determined by the determining section that a difference exists, outputs the level detected by the detecting section.

(O)

An information processing method comprising:

an accepting step of accepting an atmospheric pressure and a temperature detected by another detection device, and an altitude at which the other detection device is located;

an atmospheric pressure detecting step of detecting an atmospheric pressure at a location where an information processing device that is mobile exists;

a computing step of computing an altitude at a time when detection is performed by the atmospheric pressure detecting step, on a basis of the atmospheric pressure, the temperature, and the altitude accepted by the accepting step and the atmospheric pressure detected by the atmospheric pressure detecting step;

an identifying step of identifying, from a storing step of storing a correspondence between a level and an elevation of the level, a level corresponding to the altitude computed by the computing step;

a detecting step of detecting, on a basis of a status of an owner of the mobile information processing device, a level on which the owner is located;

a determining step of determining whether a difference exists between the level detected by the detecting step and the level identified by the identifying step;

a correcting step of, if it is determined by the determining step that a difference exists, correcting the level identified by the identifying step, by using the level detected by the detecting step; and an outputting step of, if it is determined by the determining step that a difference exists, outputs the level corrected by the correcting step.

(P)

A computer readable storage medium recording an information processing program for causing a computer to function as:

an accepting section that accepts an atmospheric pressure and a temperature detected by another detection device, and an altitude at which the other detection device is located;

an atmospheric pressure detecting section that detects an atmospheric pressure at a location where an information processing device that is mobile exists;

a computing section that computes an altitude at a time when detection is performed by the atmospheric pressure detecting section, on a basis of the atmospheric pressure, the temperature, and the altitude accepted by the accepting section and the atmospheric pressure detected by the atmospheric pressure detecting section;

an identifying section that identifies, from a storing section that stores a correspondence between a level and an elevation of the level, a level corresponding to the altitude computed by the computing section;

a detecting section that detects, on a basis of a status of an owner of the mobile information processing device, a level on which the owner is located;

a determining section that determines whether a difference exists between the level detected by the detecting section and the level identified by the identifying section;

a correcting section that, if it is determined by the determining section that a difference exists, corrects the level identified by the identifying section, by using the level detected by the detecting section; and an outputting section that, if it is determined by the determining section that a difference exists, outputs the level detected by the detecting section.

Figure 13:
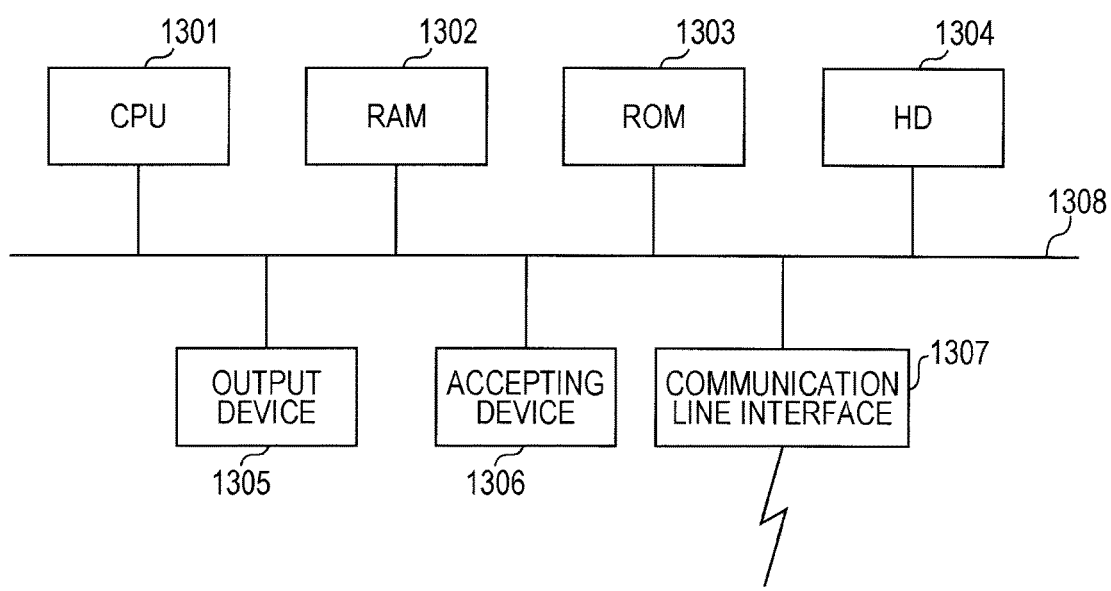
FIG. 13 is a block diagram illustrating an exemplary hardware configuration of a computer that implements the embodiment.

The hardware configuration of a computer on which the processing method and the processing program according to the embodiment are executed is that of a general computer as illustrated in FIG. 13, specifically, a computer or the like that can serve as a mobile phone or a notebook PC in the case of the mobile information processing device 200 and the mobile information processing device 250, and as a server in the case of the location determination processing device 220. That is, as a specific example, a CPU 1301 is used as a processing unit (arithmetic unit), and a RAM 1302, a ROM 1303, and a HD 1304 are used as storage devices. For example, a hard disk may be used as the HD 1304. The computer is made up of: the CPU 1301 that executes a program for implementing modules such as the atmospheric pressure detecting module 110, the user status detecting module 115, the location detecting module 120, the reference information acquiring module 130, the elevation determining module 130, the output module 160, the erroneous determination monitoring module 170, the determination correcting module 180, the output module 230, the atmospheric pressure detecting module 255, the temperature detecting module 260, the location detecting module 265, and the output module 280; the RAM 1302 that stores the program and data; the ROM 1303 in which a program for booting the computer, and the like are stored; the HD 1304 that serves as an auxiliary storage device; an accepting device 1306 that accepts detection results from various sensors, or accepts data on the basis of a user's operation with a keyboard, a mouse, a touch panel, or the like; an output device 1305 such as a liquid crystal display; a communication line interface 1307 for establishing a connection with a wireless communication line, such as a network interface card; and a bus 1308 that interconnects the above-mentioned components to exchange data. Multiple such computers may be connected to each another via a network.

For features based on a computer program in the above-mentioned embodiment, a system having the above-mentioned hardware configuration is caused to read the computer program as software, and as the software cooperates with hardware resources, the above-mentioned embodiment is implemented.

The hardware configuration illustrated in FIG. 13 is merely an exemplary configuration, and the embodiment is not limited to the configuration illustrated in FIG. 13 as long as the modules described in the embodiment can be executed. For example, some modules may be implemented by dedicated hardware (such as an ASIC), and some modules may be provided in an external system and may be connected via a communication line. Further, multiple systems configured as illustrated in FIG. 13 may be connected to each another by a communication line so as to operate in cooperation with each other.

In the above description made with reference to FIG. 12 and the like, the user status detecting module 115 detects movement of a mobile information processing device at the position of step S1202. However, the determination process in step S1202 may be performed at a time preceding step S1210. An example of a time preceding step S1210 is immediately before step S1210. However, a time preceding step S1210 is not limited to immediately before S1210 but may be any given time preceding step S1210.

If, in the determination process in step S1202, the user status detecting module 115 detects movement of an information processing device, the process in step S1210 is executed as it is. If it is detected in S1202 by the user status detecting module 115 that there has been no movement of an information processing device, the level that was output last time in step S1210 may be used to correct Floor Information A obtained as a determination result. For example, the level that was output last time may be used as the result of the current determination as it is. Further, a function may be corrected.

The processing to be executed by the user status detecting module 115, the erroneous determination monitoring module 170, and the determination correcting module 180 may be executed at predetermined intervals of time (for example, every 12 hours). This is because the need for correction decreases after the computational function is corrected. Alternatively, the processing to be executed by the user status detecting module 115, the erroneous determination monitoring module 170, and the determination correcting module 180 may be executed if the difference between the "atmospheric pressure detected by the atmospheric pressure detecting module 110 at the time when a correction was made last time" and the "atmospheric pressure detected by the atmospheric pressure detecting module 110 this time" is greater than or equal to a predetermined value.

A program described herein may be provided in the form of being stored in a recording medium, or the program may be provided via communication means. In that case, for example, the above-mentioned program may be understood as an invention relating to a "computer readable recording medium recording a program".

The "computer readable recording medium recording a program" refers to a computer readable recording medium on which a program is recorded and which is used for purposes such as installing, executing, and distributing the program.

Examples of the recording medium include digital versatile discs (DVDs), such as "DVD-R, DVD-RW, DVD-RAM, and the like", which are standards developed by the DVD Forum, and "DVD+R, DVD+RW, and the like", which are standards developed by the DVD Forum, compact discs (CDs) such as read-only memory (CD-ROM), CD-Recordable (CD-R), and CD-Rewritable (CD-RW) discs, Blu-ray (registered trademark) discs, magneto-optical disks (MOs), flexible disks (FDs), magnetic tapes, hard disks, read-only memories (ROMs), electrically erasable programmable read-only memories (EEPROMs (registered trademark)), flash memories, random access memories (RAMs), and Secure Digital (SD) memory cards.

The above-mentioned program or a portion thereof may be recorded on the above-mentioned recording medium for purposes such as saving and distribution. Alternatively, the program may be transmitted via a transmission medium such as a wired network or a wireless communication network which is used for a local area network (LAN), a metropolitan area network (MAN), a wide area network (WAN), the Internet, an intranet, an extranet, and the like, or a combination thereof, or may be carried on a carrier wave.

Further, the program mentioned above may be part of another program, or may be recorded on a recording medium together with a different program. Alternatively, the program may be recorded separately on multiple recording media. Furthermore, the program may be recorded in any form, such as compressed or encrypted, as long as the program can be restored.

The invention claimed is:

1. A location determination device comprising:
at least one processor; and
a memory that stores a correspondence between levels within a building and an elevation of the respective levels within the building, wherein
the memory is coupled to the at least one processor, and
the at least one processor is configured to:
receive, from a first information processing device, reference information detected by one or more sensors of the mobile information processing device, the reference information including information related to atmospheric pressure, information related to temperature, and information related to altitude;
receive, from a second information processing device, which is a mobile device, information related to atmospheric pressure for a location where the second a-mobile information processing device exists;
compute an altitude of the second information processing device based on the reference information received from the first information processing device and the information related to atmospheric pressure received from the second information processing device;
identify, from the memory that stores the correspondence between the levels within the building and the elevation of the respective levels within the building, a level within the building corresponding to the computed altitude;
detect, based on an activity pattern of an owner of the second information processing device, a level in the building on which the owner is located;
determine whether a difference exists between the detected level within the building on which the user is located, and the level in the building identified from the memory; and
if the determination result indicates that a difference exists between the detected level and the level identified from the memory, correct the level within the building on which the user is located, and output the corrected level.

2. The location determination processing device according to claim 1, wherein the processor is further configured to:
if the determination result indicates that a difference exists between the detected level and the level identified from the memory, correct a function used for computing the altitude of the second information processing device based on the reference information received from the first information processing device and the information related to atmospheric pressure received from the second information processing device; and
compute the altitude of the second information processing device by using the corrected function.

3. The location determination processing device according to claim 1, wherein the correcting of the level within the building on which the user is located includes correcting the identified level to be the detected level.

4. The location determination processing device according to claim 1, wherein the processor is further configured to:
detect whether the second information processing device has moved; and
after detecting that the second mobile information processing device has moved: compute the altitude of the second information processing device based on the reference information received from the first information processing device and the information related to atmospheric pressure received from the second information processing device.

5. The location determination processing device according to claim 1, wherein the processor is further configured to:
detect whether the second information processing device has moved; and
if it is detected that there has been no movement of the second information processing device, output a previously output level within the building.

6. The location determination processing device according to claim 1, wherein the processor is further configured to:
receive a time at which the one or more sensors detected an atmospheric pressure and a time at which the one or more sensors detected a temperature, and
if the received time at which the one or more sensors detected the atmospheric pressure and the received time at which the one or more sensors detected the temperature is within a predetermined time range, compute the altitude of the second information processing device based on the detected atmospheric pressure and the detected temperature, reference information received from the first information processing device and the information related to atmospheric pressure received from the second information processing device.

7. The location determination processing device according to claim 1, wherein the activity pattern of the owner of the second information processing device is a schedule of the owner carrying the mobile information processing device at specific levels and a time at which detection of the respective level was performed.

8. The location determination processing device according to claim 1, wherein
the one or more sensors comprises a plurality of sensors, and
the reference information includes a plurality of atmospheric pressures, a plurality of temperatures, and a plurality of altitudes, and
the processor is further configured to:
compute the altitude of the second information processing device based on an atmospheric pressure, a temperature, and an altitude that are respectively statistical representative values of the plurality of atmospheric pressures, the plurality of temperatures, and the plurality of altitudes.

9. The location determination processing device according to claim 1, wherein the processor is further configured to: if a person carrying the second information processing device has used a stationary information processing device, an altitude of a location where the stationary information processing device is installed is determined as the altitude of the second information processing device, the stationary information processing device being an information processing device that is fixed in position.

10. The location determination processing device according to claim 1, wherein the processor is further configured to: if a person carrying the second information processing device has passed through an entry and exit management device, an altitude of a location where the entry and exit management device is installed is determined as the altitude of the second information processing device.

11. The location determination processing device according to claim 10, wherein the processor is further configured to: after passage through the entry and exit management device, determine the altitude of the second information processing device based on a change in a detected atmospheric pressure detected by the one or more sensors, and the altitude of the location where the entry and exit management device is installed.

12. A non-transitory computer readable storage medium comprising information processing program instructions that, when executed by a processor, cause the processor to:
receive, from a first information processing device, reference information detected by one or more sensors of the mobile information processing device, the reference information including information related to atmospheric pressure, information related to temperature, and information related to altitude;
receive, from a second information processing device, which is a mobile device, information related to atmospheric pressure for a location where the second mobile information processing device exists;
compute an altitude of the second information processing device based on the reference information received from the first information processing device and the information related to atmospheric pressure received from the second information processing device;
identify, from a memory that stores a correspondence between levels within a building and an elevation of the respective levels within the building, a level within the building corresponding to the computed altitude;
detect, based on an activity pattern of an owner of the second information processing device, a level in the building on which the owner is located;
determine whether a difference exists between the detected level within the building on which the user is located, and the level in the building identified from the memory; and
if the determination result indicates that a difference exists between the detected level and the level identified from the memory, correct the level within the building on which the user is located, and output the corrected level.

* * * * *